Nov. 1, 1932.  A. B. WELTY  1,886,140
STRAW SPREADER FOR HARVESTER THRESHERS
Filed April 6, 1931  2 Sheets-Sheet 1

Inventor:
Albert B. Welty
By H. P. Doolittle
Atty.

Nov. 1, 1932.     A. B. WELTY     1,886,140
STRAW SPREADER FOR HARVESTER THRESHERS
Filed April 6, 1931     2 Sheets-Sheet 2
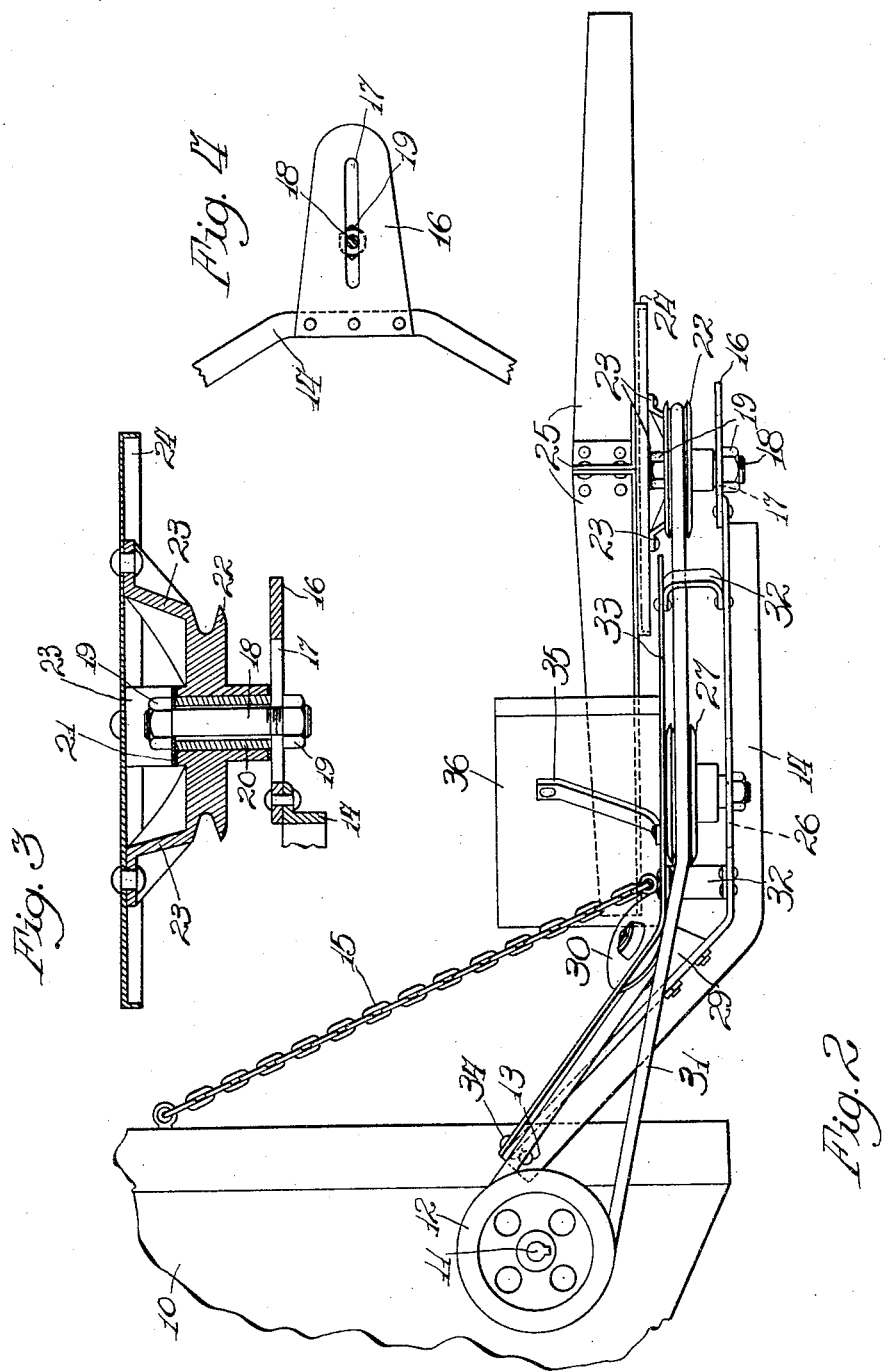

Patented Nov. 1, 1932

1,886,140

UNITED STATES PATENT OFFICE

ALBERT B. WELTY, OF CHICAGO, ILLINOIS, ASSIGNOR TO INTERNATIONAL HARVESTER COMPANY, A CORPORATION OF NEW JERSEY

STRAW SPREADER FOR HARVESTER THRESHERS

Application filed April 6, 1931. Serial No. 527,879.

This invention relates to a straw spreader attachment for harvester threshers.

Straw spreader attachments as now known in the art are relatively complicated and heavy, as they employ a number of sprocket chains and drive connections, which make the same too costly.

The main object of this invention, therefore, is to provide a straw spreading attachment for harvester threshers which will have a minimum of parts and use only one drive belt with the thought in mind of making the same as light and cheap as possible.

These objects are accomplished by the illustrative example of the attachment disclosed herein in which the attachment comprises a generally U-shaped main frame piece having its legs pivotally connected to the rear end of the body of the thresher. Flexible elements support this frame from the body to limit its downward movement. The rearward central part of the U-frame carries a bracket which adjustably mounts a vertical bearing structure carrying an integrally formed pulley and fan arm plate. Fan arms are carried in a cross on the plate. One side of the U-frame appropriately carries idler pulleys, there being an endless belt trained around the fan plate drive pulley and the idlers and a pulley driven from the thresher body. The structure is very simple and light and utilizes only one driving belt.

In the drawings,—

Figure 2 is a side view of the construction shown in Figure 1;

Figure 3 is a vertical cross sectional view through the drive pulley and fan arm plate structure; and, Figure 4 is a plan detail view of the bracket which supports the fan arm spreader device.

Figure 1:
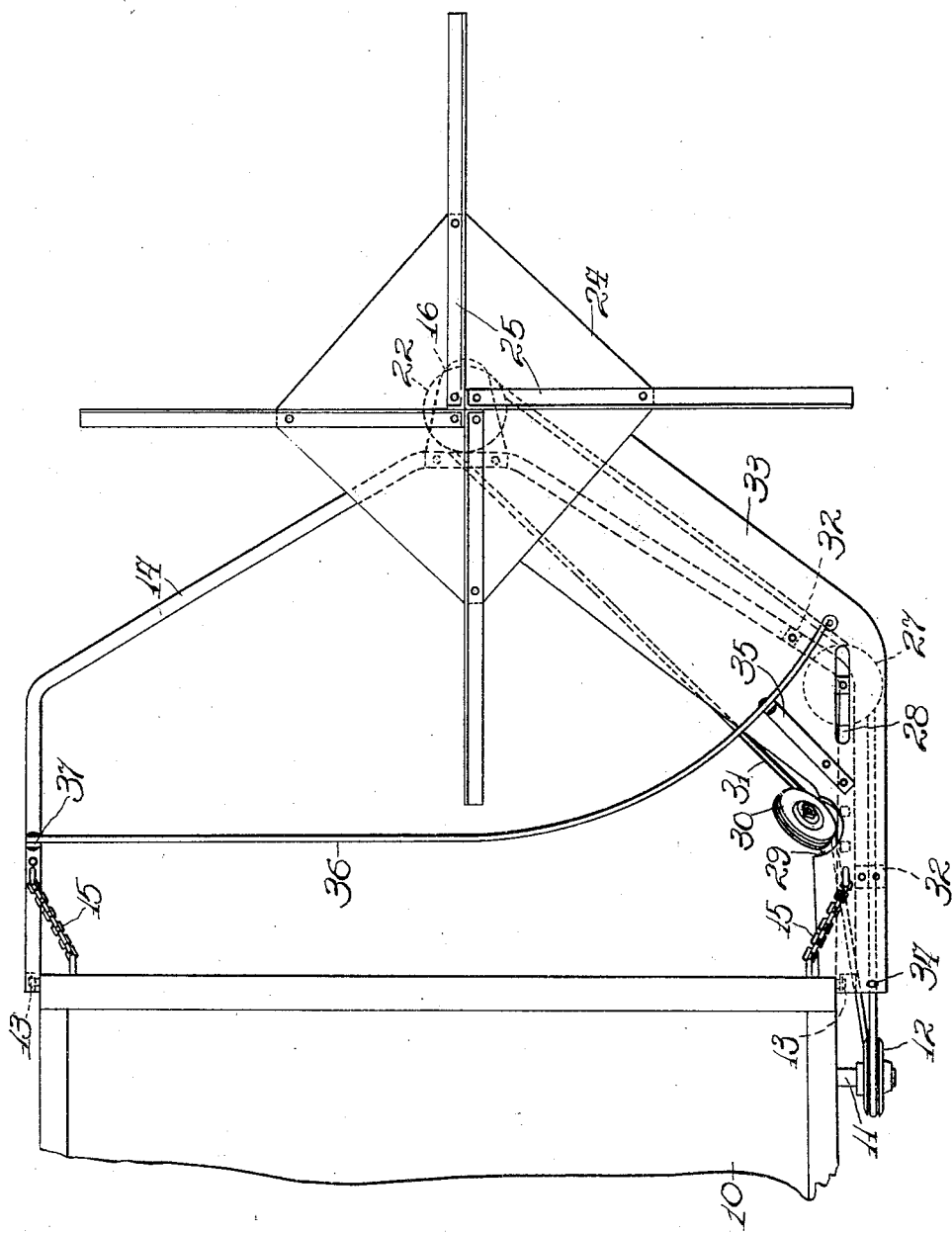
Figure 1 is a plan view of the rear end of a thresher body with the improved straw spreader connected thereto.

The rear end of a harvester thresher body has been shown at 10, from which protrudes a transverse shaft 11 carrying a grooved pulley wheel 12. Pivotally connected at opposite points 13 at the rear end of the body is a light angle bar, U-shaped frame member 14, which is suspended from the body 10 by flexible elements, such as the chains 15, that prevent or limit downward pivoting movement of the frame 14.

The rearmost central portion of the U-frame piece 14 carries, as best shown in Figures 3 and 4, a horizontal bracket 16 provided with a longitudinal slot 17 arranged along the longitudinal median line of the thresher body and spreader attachment. This slot 17 carries a vertical bolt or shaft 18 carrying upper and lower nuts 19 for holding a vertical bushing 20 on the bracket 16, there being a suitable washer 21 to hold these parts together. A grooved pulley wheel 22 operating in a horizontal plane is rotatably journaled on the bushing 20.

Integrally formed with this pulley wheel 22 are upwardly and outwardly extending arms 23 providing at their top ends horizontal surfaces to which are riveted or otherwise secured a horizontally disposed fan arm plate 24. Mounted in a cross on said fan plate 24 are fan arms 25 which extend beyond the peripheral edge of said plate 24, as best shown in Figure 1.

One leg or side of the U-frame 14 is provided with a slot 26 to mount a shaft for carrying a horizontal idler pulley wheel 27, which is adjustable fore and aft in said slot 26. Both legs of the frame, as shown in Figure 2, extend downwardly and horizontally, it being the horizontal portion which carries the bearing bracket 26. The same leg of the frame 14 also carries on its downwardly extending part a bracket 29 for similarly mounting an angularly disposed grooved idler pulley wheel 30. An endless belt 31, which preferably is circular and made of rubber or similar composition is trained around the driven pulley 12 on the thresher body 10 and then goes around the idler pulley 27, then horizontally around the spreader drive pulley 22, this latter run of the belt extending inwardly toward and to the longitudinal median line heretofore mentioned; then back to and under the inclined pulley 30 and back around the drive pulley 12. In this manner the pulley 22 is rotated, and, as the plate 24 is secured to said pulley, rotation is imparted to the plate and fan arms 25 carried thereby. It can be seen now that a single endless drive belt is utilized for transmitting power directly from the thresher body to operate the straw spreader attachment.

The same leg of the frame 14 which carries the idler pulleys 27 and 30 also is provided with a number of spacer brackets 32, said brackets carrying a shield 33, which lies above the run of the belt 31. Said shield is formed with a slot 28 registering with slot 26 heretofore described whereby to carry the bolt mounting pulley 27 for adjustment. Thus the shield comprises a horizontal portion and an inclined portion with the upper end of the inclined portion secured at 34 to the upper end of the inclined portion of the leg of the frame piece 14. This shield is designed to keep straw away from the driving parts. The shield 33 carries a brace 35 for mounting a curved vertical shield 36, which extends across the frame 14 and has its opposite end connected at 37 in any appropriate manner to the other leg of the frame piece 14. The shield in the usual way prevents the fan arms 25 from throwing the straw back into the thresher body.

In use, the frame 14 is hung onto the rear end of the thresher body in the manner described by means of the pivots 13 and the suspension chains 15. The belt 31 is trained around the driven pulley 12 of the thresher and in the manner described drives the pulley 22 to operate the table 24 and the fan arms 25 carried thereby. The straw being discharged rearwardly from the body of the thresher falls downwardly onto the table 24 and is then thrown out by the fan arms 25 to spread the same evenly over the field along the path traversed by the machine.

From this disclosure it must now be apparent that a simplified and light straw spreader attachment has been provided, which can be manufactured at a minimum of cost and which, because of its very simplicity, is fool proof in operation and not likely to get out of order, thus achieving the objects of the invention heretofore recited.

It is the intention to cover herein all such changes and departures from the form of the invention herein shown which do not in material respects depart from the spirit and scope of said invention. The invention is expressed in the following claims.

What is claimed is:

1. A straw spreader for harvester threshers having a body and a driven wheel carried on a horizontal axis at the side of said body, said straw spreader comprising a frame member pivotally attached to the said body, means for supporting the frame member from the body, a flat horizontally disposed bracket carried by the frame member and provided with a fore and aft extending slot, a straw spreader including a drive wheel rotatably mounted on said bracket on a vertical bushing, a single endless element for directly driving the drive wheel from the driven wheel, said vertical bushing including means mounted in said slot adjustably to fix the straw spreader toward or from said body.

2. A straw spreader for harvester threshers having a body and a driven wheel, said straw spreader comprising a U-shaped frame member having its legs pivotally attached to the said body, flexible elements for supporting the frame member from the body, a bracket carried by the frame member, a straw spreader including a drive wheel rotatably mounted on said bracket, said bracket having a slot formed therein, means for adjustably setting the straw spreader and drive wheel along said slot, and a single endless element for driving the drive wheel from the driven wheel.

3. A straw spreader for harvester threshers having a body and a driven wheel, said straw spreader comprising a U-shaped frame member having its legs pivotally attached to the said body, means for supporting the frame member from the body, a bracket carried by the frame member, a straw spreader including a drive wheel rotatably mounted on said bracket, means whereby the spreader may be adjustably set on the frame toward or from the body, a single endless element for driving the drive wheel from the driven wheel, a plate carried by one leg of the frame embodying a horizontal portion located above the endless element to shield the same, and a curved vertical shield carried on the plate and frame between the body and spreader.

4. A straw spreader for harvester threshers having a body and a driven wheel, said straw spreader comprising a U-shaped frame member having its legs pivotally attached to the said body, means for supporting the frame member from the body, a horizontally disposed bracket carried centrally at the bight of the frame member, said bracket formed with a fore and aft extending slot carrying a vertical bolt, a bushing around the bolt, a horizontal drive pulley wheel journaled on the bushing, a straw spreader connected to said horizontal pulley wheel, said slot serving to enable positioning of the bolt toward or from the body to locate the straw spreader relative thereto, an endless belt for driving the horizontal drive pulley from the driven wheel, and an idler wheel carried by one leg of the frame and engaging said endless belt.

5. A straw spreader for harvester threshers having a body and a driven wheel, said straw spreader comprising a U-shaped frame member having its legs pivotally attached to the said body, flexible elements for supporting the frame member from the body, a bracket carried centrally at the bight of the frame member, said bracket carrying a vertical bolt, a bushing around the bolt, a horizontal drive pulley wheel journaled on the bushing, a straw spreader connected to said horizontal pulley wheel, an endless belt for driving the horizontal drive pulley from the driven wheel, an idler wheel carried by one leg of the frame engaging said endless belt, a shield carried by the same leg of the frame and having a horizontal portion arranged above the endless element to shield the same, and a vertically disposed shield carried by the aforementioned shield at one end and at its other end by the remote leg of the frame, said vertical shield having a position between the body and spreader.

In testimony whereof I affix my signature.

ALBERT B. WELTY.